No. 758,563. PATENTED APR. 26, 1904.
E. RUNGE.
TYPE WRITER.
APPLICATION FILED AUG. 8, 1901.
NO MODEL. 11 SHEETS—SHEET 1.
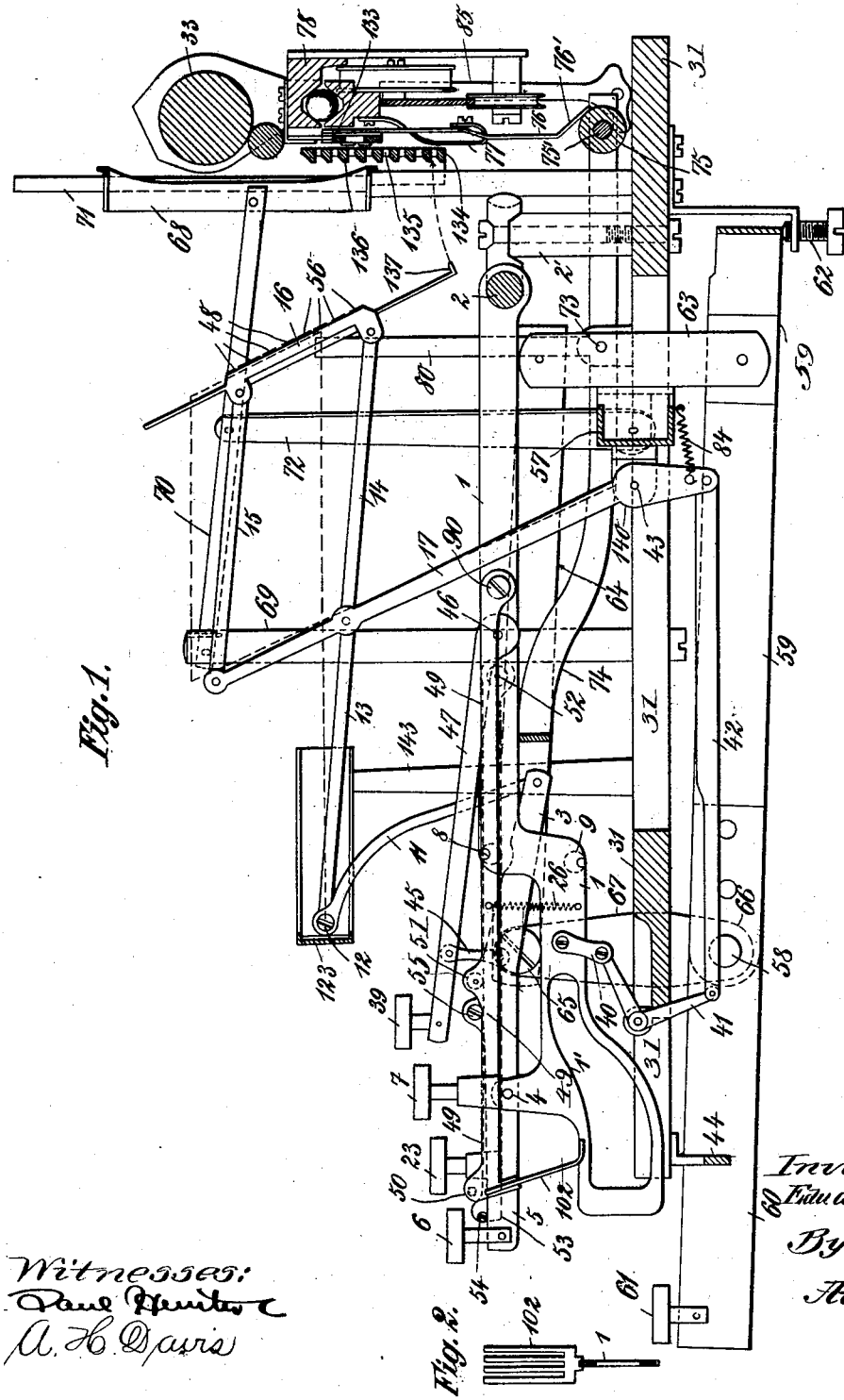

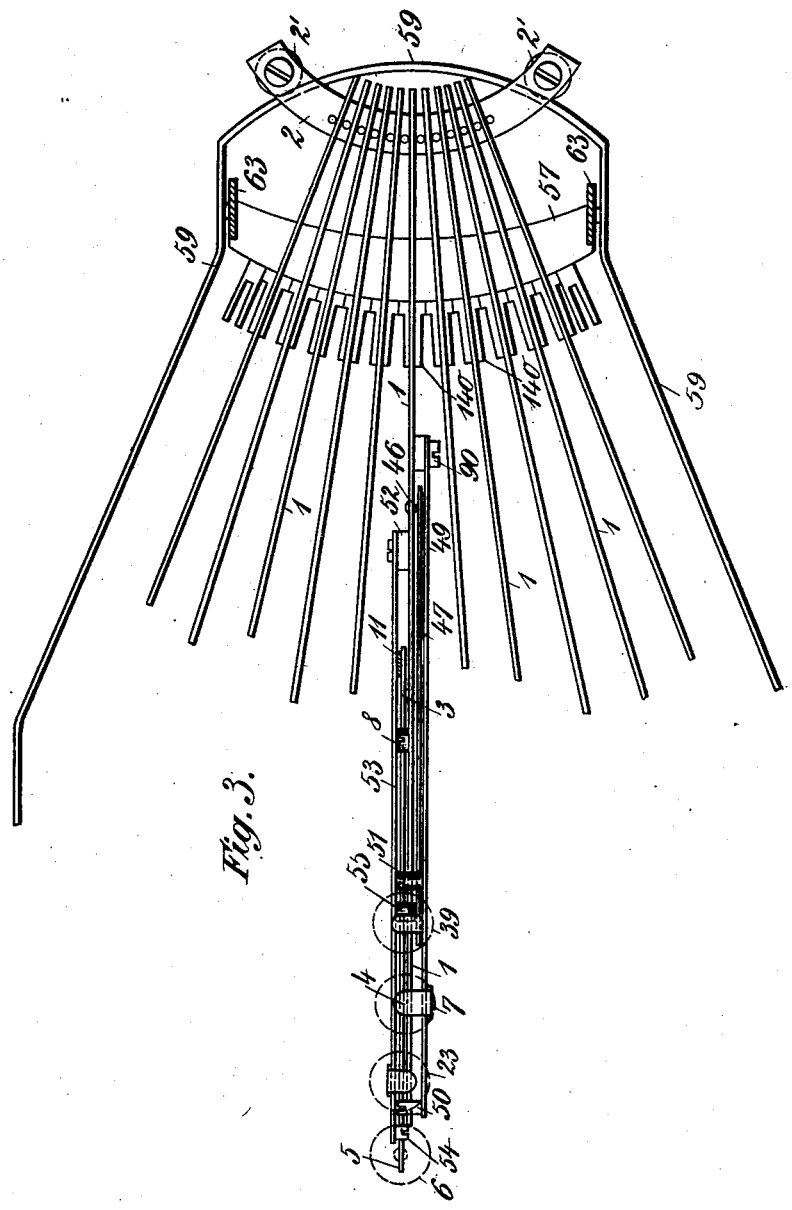

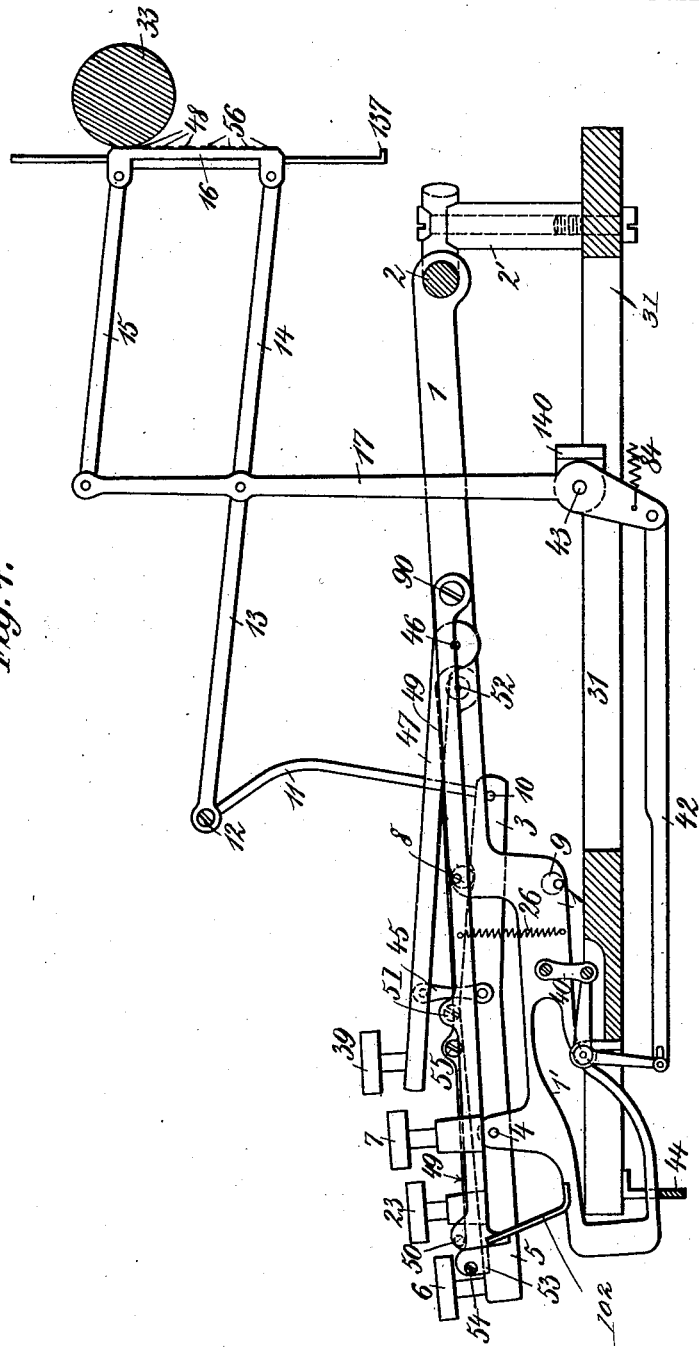

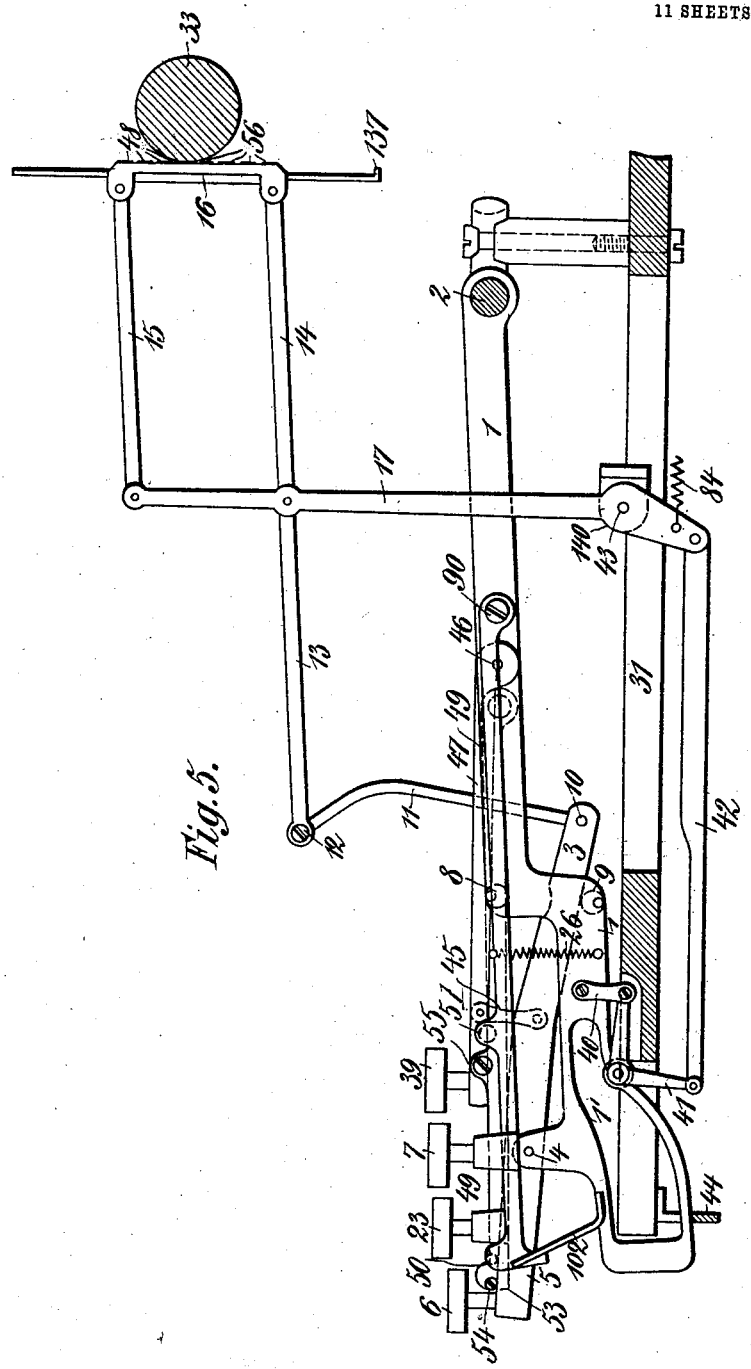

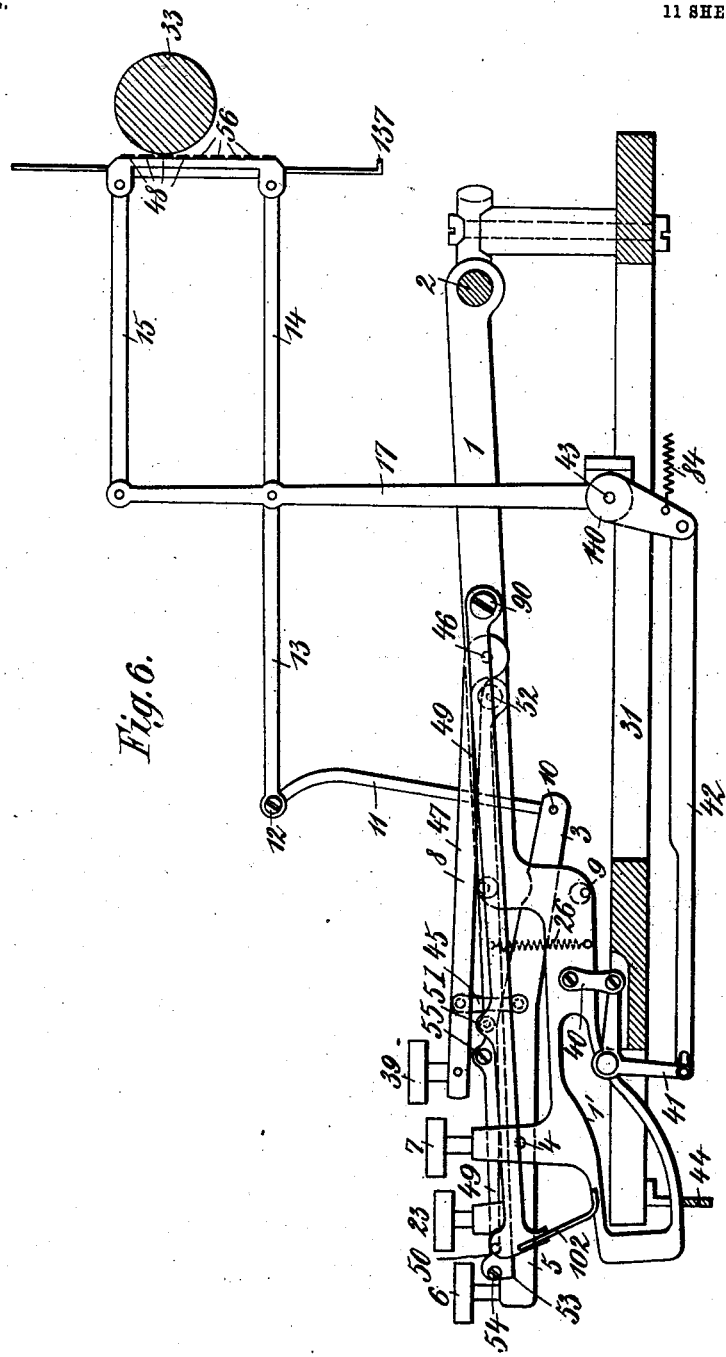

No. 758,563. PATENTED APR. 26, 1904.
E. RUNGE.
TYPE WRITER.
APPLICATION FILED AUG. 8, 1901.
NO MODEL. 11 SHEETS—SHEET 6.
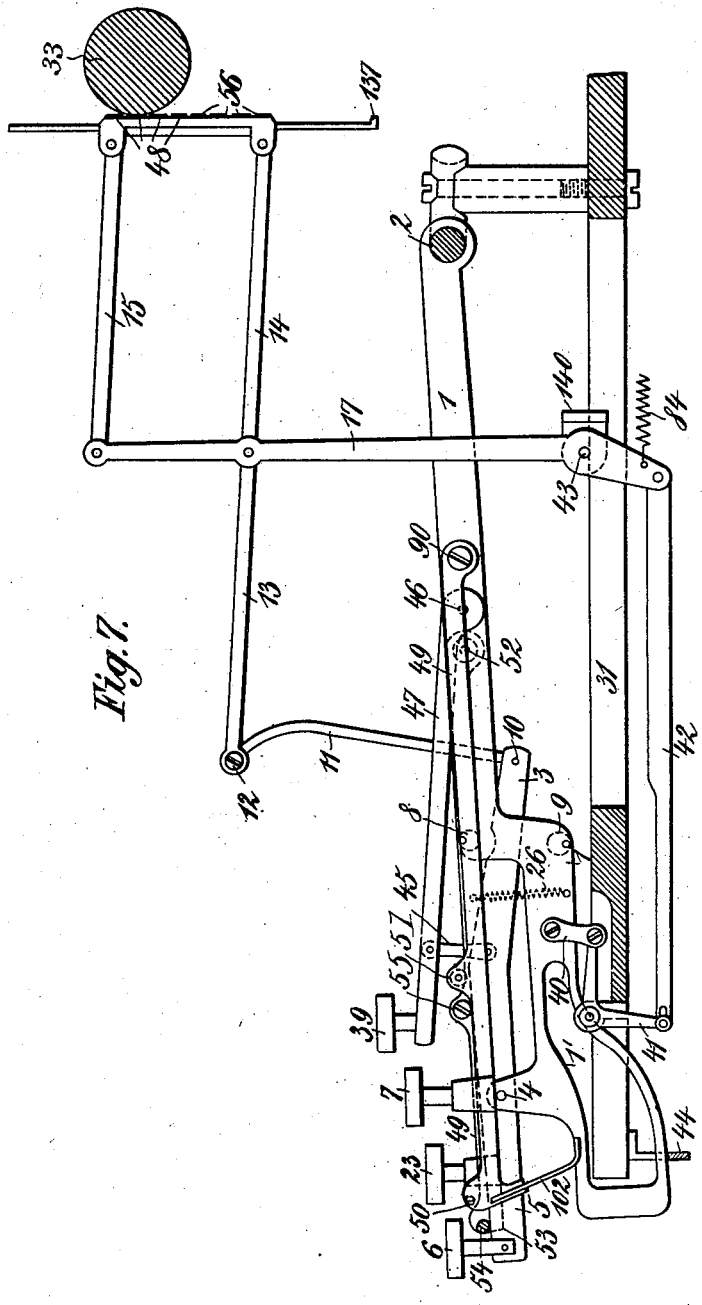

No. 758,563. PATENTED APR. 26, 1904.
E. RUNGE.
TYPE WRITER.
APPLICATION FILED AUG. 8, 1901.
NO MODEL. 11 SHEETS—SHEET 7.
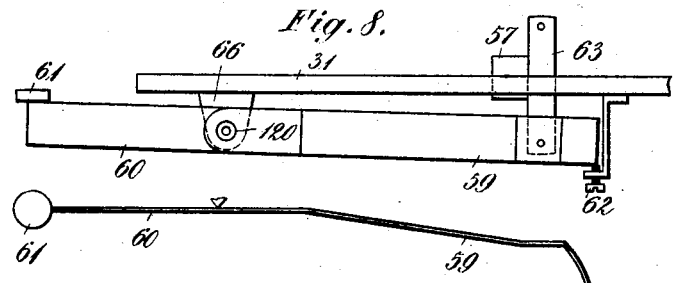
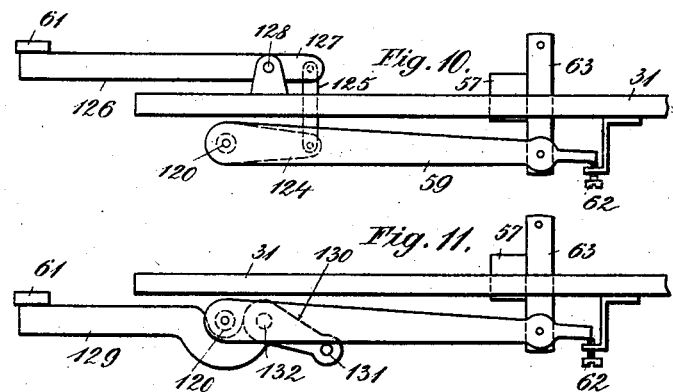
Witnesses:
Paul Hunter
A. H. Davis
Inventor
Eduard Runge
By Munn
Attorneys

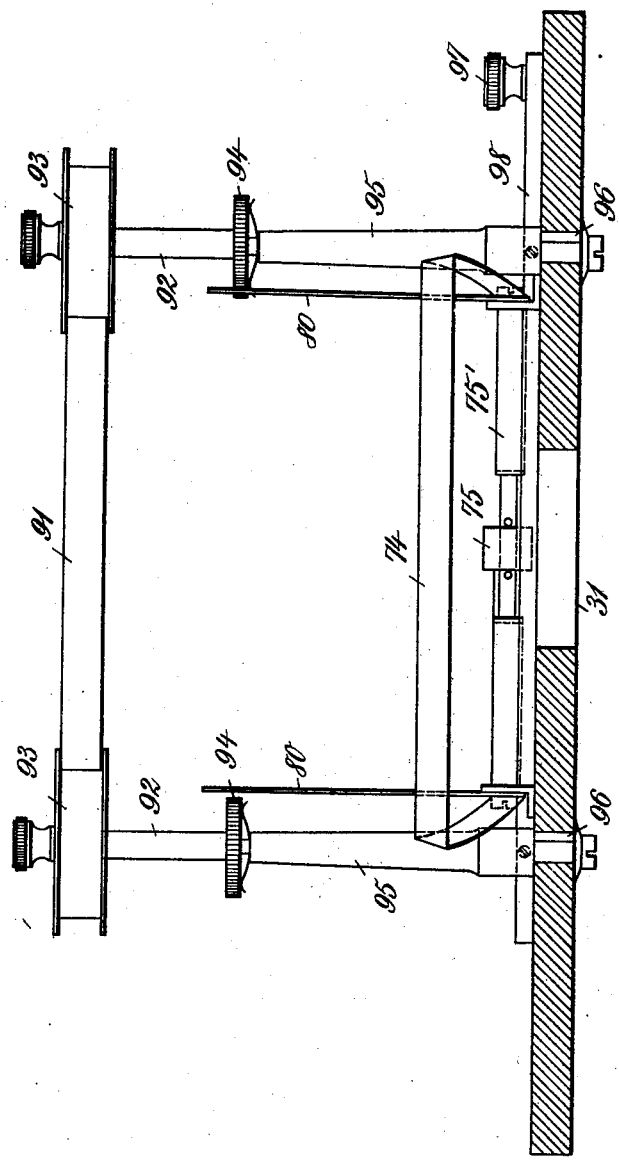

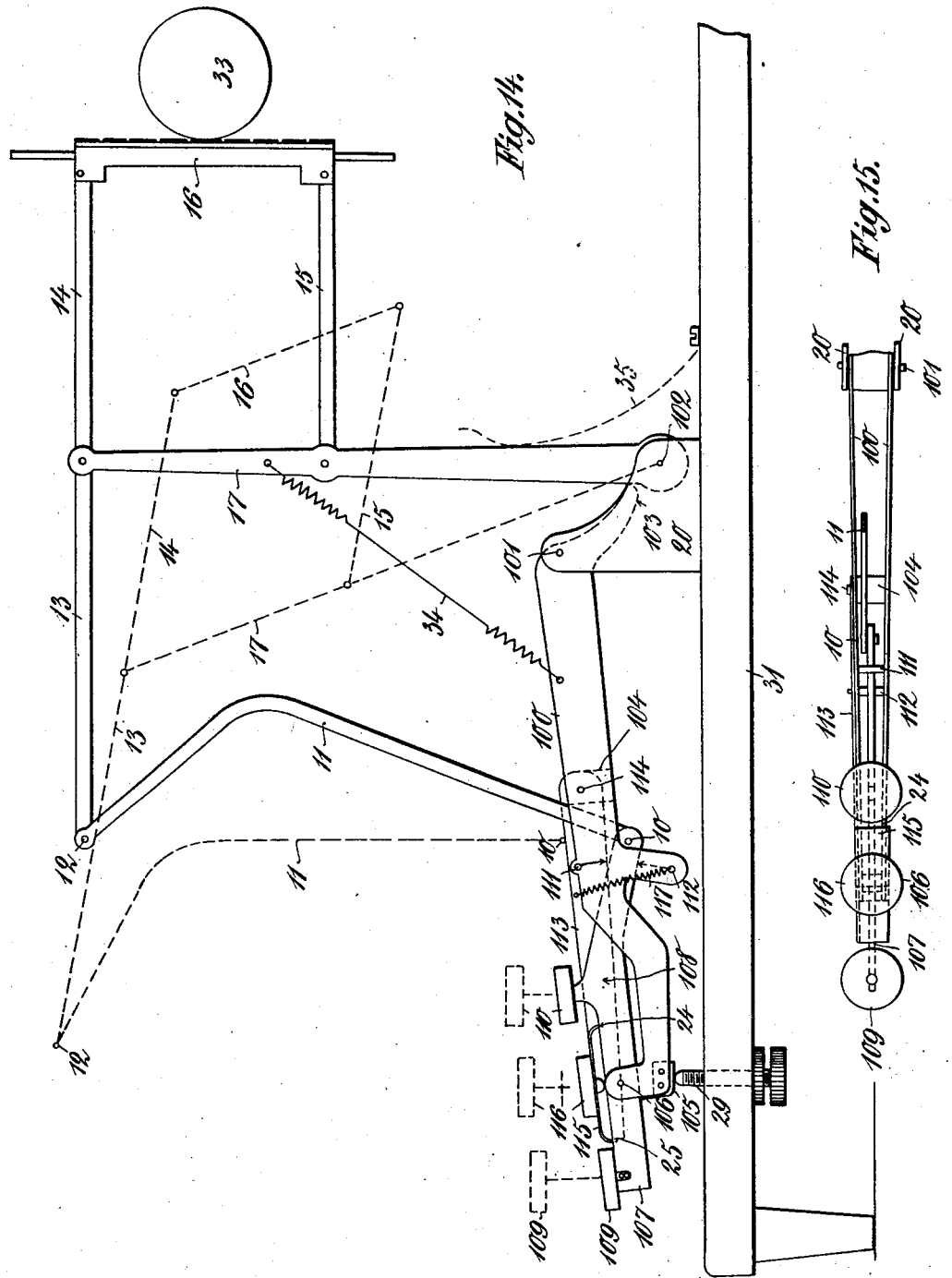

No. 758,563. PATENTED APR. 26, 1904.
E. RUNGE.
TYPE WRITER.
APPLICATION FILED AUG. 8, 1901.
NO MODEL.
11 SHEETS—SHEET 10.
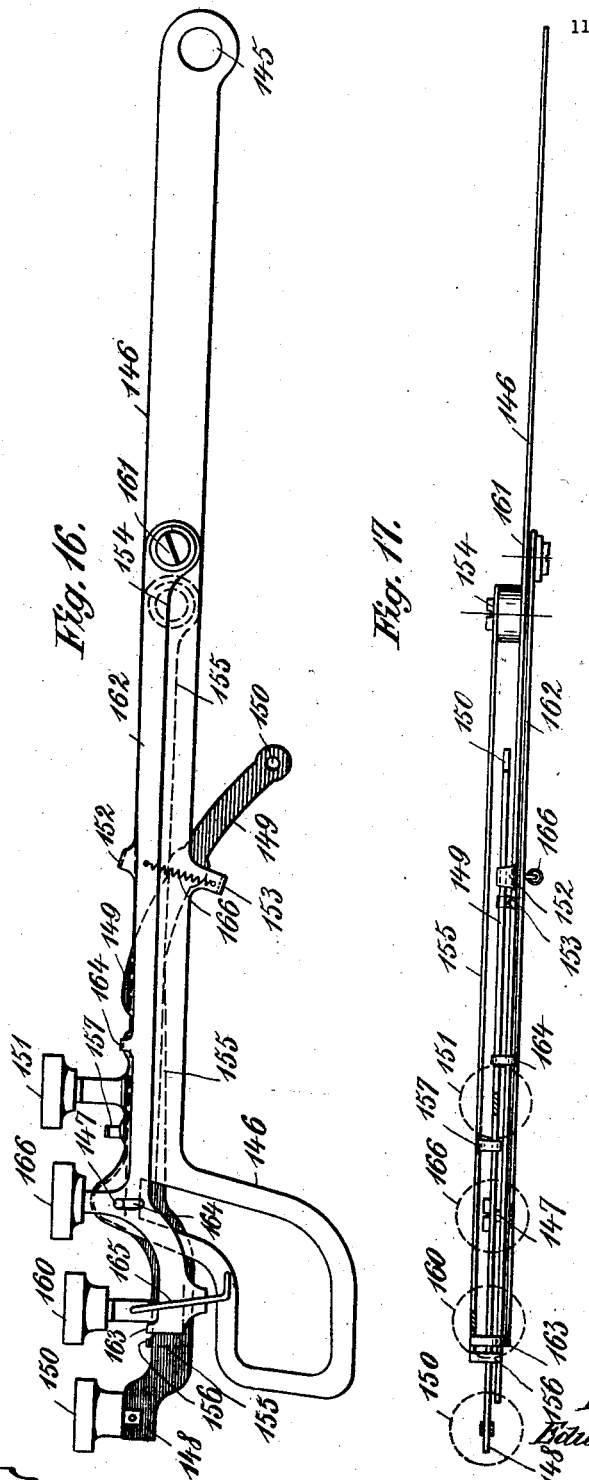
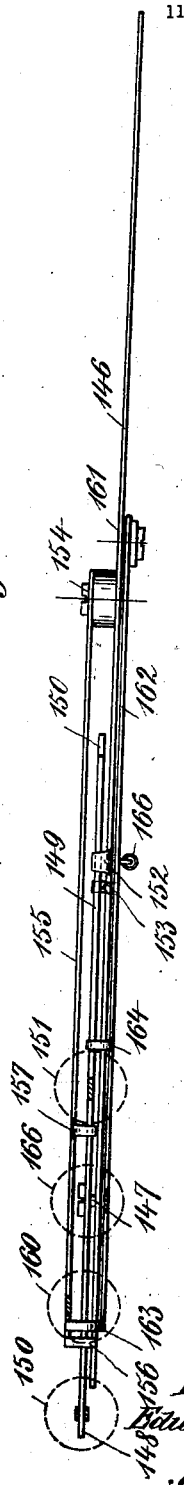

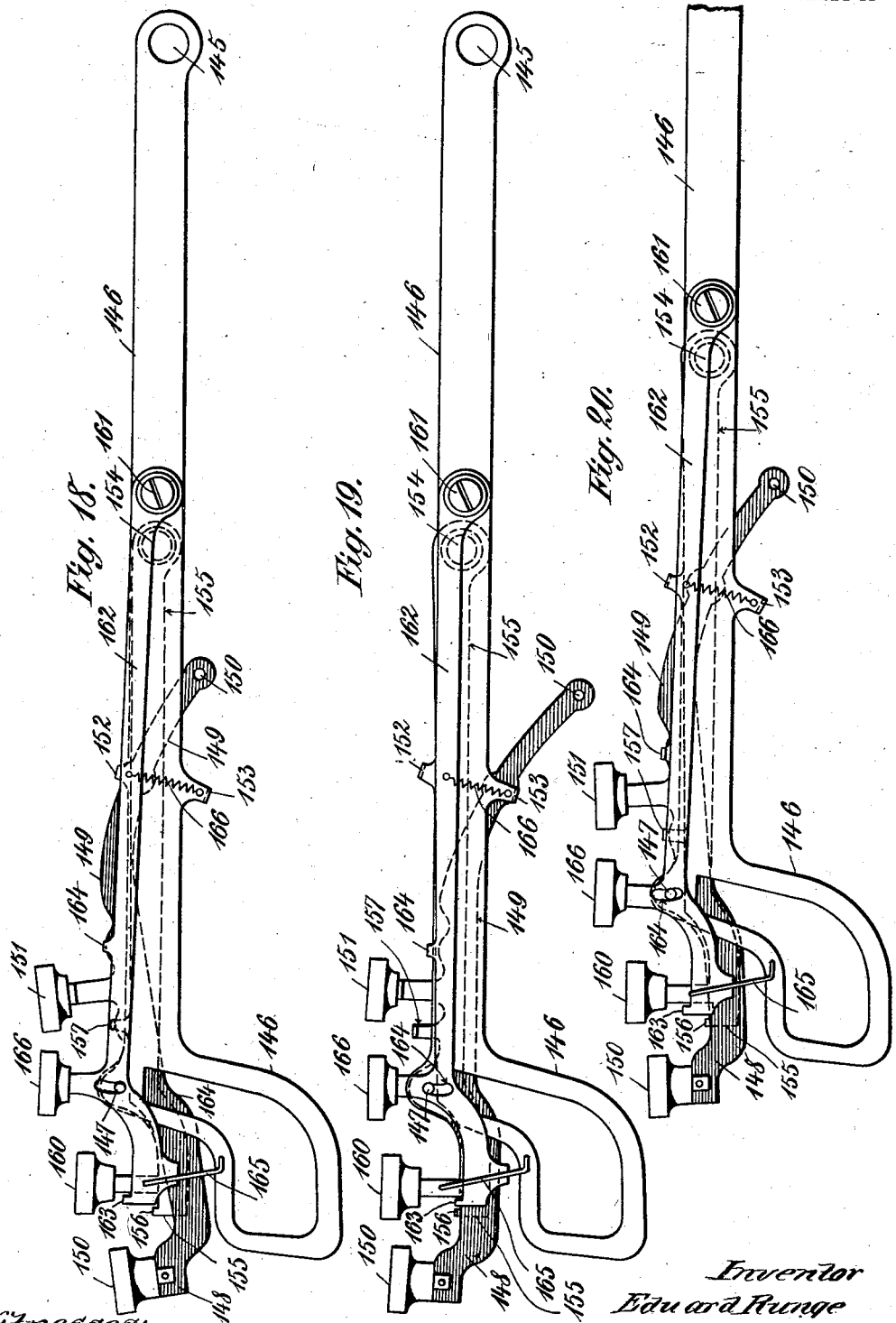

No. 758,563. Patented April 26, 1904.

UNITED STATES PATENT OFFICE.

EDUARD RUNGE, OF BERLIN, GERMANY, ASSIGNOR TO GREVE, HERZBERG AND COMPANY, OF BERLIN, GERMANY, A FIRM.

TYPE-WRITER.

SPECIFICATION forming part of Letters Patent No. 758,563, dated April 26, 1904.

Application filed August 8, 1901. Serial No. 71,338. (No model.)

*To all whom it may concern:*

Be it known that I, EDUARD RUNGE, a subject of the Emperor of Germany, residing at Berlin, in the Empire of Germany, have invented a new and useful Type-Writer, of which the following is a specification.

My invention relates to improvements in type-writers in which type-carriers each carrying a number of types are so operated by means of type-disposing devices that always the required type in correspondence to the key depressed is brought into the proper position for striking and printing; and the invention includes an improved construction, arrangement, and combination of parts, whereby important advantages are attained in respect to simplification of the apparatus, adaptation for convenient inspection of the various parts, whereby the machine is rendered capable of doing more work, the types are caused to strike better against the paper-roll in proportion to the force applied, and the striking force can be adjusted.

It is a characteristic of the invention that the striking-lever, which is not connected positively with the key, is actuated in such a manner as to strike the type-carrier when adjusted against the paper-roll.

The type-disposing device carried by every key-lever may be actuated by three or four keys. When assuming each key-lever to carry four keys, the advantage is obtained that it is possible to provide the type-carrier with eight types in two groups of four each, which may be brought into the printing position on depressing the respective key, the arrangement of the lever mechanism being so made that either type of the one group may strike against the paper-roll while the lever mechanism is in the usual position in relation to the paper-roll and that either type of the other group may strike against the paper-roll while the position of the lever mechanism is changed in relation to the paper-roll. A further advantage is that for this change the paper-roll carriage need not be raised and lowered, as would be the case if there were three groups of, say, three types on the type-carriers. The paper-roll may, on the contrary, remain on the same height, while a movable frame is provided for carrying certain parts of the lever mechanism and which is capable of being raised and lowered on depressing and releasing a special key. Thus the one group of types may be used while the movable frame is at rest and the other group when this frame is raised. In this case also the advantage is obtained that the weight of the paper-roll, its carriage, the ribbon, and the other parts connected with the carriage need not be overcome by the finger depressing the respective key, but only the weight of the movable frame and the parts connected therewith, and this only when the other group of types is required for the use. By means of this simple and advantageous arrangement eight different types may be caused to strike against the paper-roll by a single key-lever. It is essential that the striking-levers arranged on the movable frame and carrying the type-carriers, as well as the type-guiding frame also controlled by the movable frame, may be changed from the one position to the other position quickly and safely during writing. For this reason the key for raising and lowering that movable frame is so arranged as to need depressing only through a small distance in proportion to the distance through which the type-carrier and the type-guiding frame require to be raised. This is rendered possible by the arrangement of striking-levers capable of being raised and lowered independently of the key-levers and by the arrangement of levers forming a parallelogram with the type-carrier and allowing of the type-carriers swinging so that the latter are raised much higher than the movable frame on its key being depressed.

The new type-writer is illustrated in the accompanying drawings, in which—

Figure 1 is a vertical longitudinal section of the machine where for the sake of clearness only one key-lever, with the parts connected therewith in the usual position, is shown. Fig. 2 is a side view of the part 102 shown in Fig. 1. Fig. 3 is a plan where a central key-lever, with its keys and various parts, is shown completely, while the ends of the remaining key-levers and of a part of the movable frame are broken off. Fig. 4 is an elevation of the central key-lever, with the parts connected therewith, while the uppermost type is in the printing position. Fig. 5 is an elevation of the same while the fourth type is in the printing position. Fig. 6 is an elevation of the same while the third type is in the printing position. Fig. 7 is an elevation of the same while the second type is in the printing position. Figs. 8 to 12 show details which will be referred to later on. Fig. 13 is a vertical cross-section of the machine immediately before the ribbon device, all the other parts of the machine being omitted for the sake of clearness. Fig. 14 is an elevation of a modification of the key-lever with parts connected therewith. Fig. 15 is a plan of the same. Fig. 16 is an elevation of a modification of the key-lever with subsidiary key-levers and keys. Fig. 17 is a plan of the same. Fig. 18 is an elevation of the same while the front key is depressed. Fig. 19 is an elevation of the same while the rear key is depressed, and Fig. 20 is an elevation of the same while the second key from the front is depressed.

Similar marks of reference refer to similar parts throughout the several views.

In the type-writer shown in Figs. 1 to 7 two studs or supports 2', of which only one is shown at Figs. 1, 4, 5, 6, and 7, are affixed on the base-plate 31. On these studs or supports 2' a rod 2, Fig. 3, bent to an arc is secured, which serves as fulcrums for a plurality— say eleven—of key-levers 1, of which only one is shown completely for the sake of clearness. The different key-levers are in plan arranged radially, converging to a point situated in the vertical line touching the printing-point on the paper-roll 33. They are allowed to swing in vertical planes and secured in their positions on the bent rod 2 by some known means, such as distance-pieces, pins, or the like. The key-lever 1 carries four keys 6, 23, 7, and 39, with which it is connected in a manner to be explained later on. The key-lever 1 is connected by means of the link 40 with the one arm of the bell-crank lever 41, which is pivoted on the base-plate 31. The other arm of the bell-crank lever 41 is connected by the rod 42 with the lower arm of the striking-lever 17, swinging around the pin 43. The latter is located in the projection 140, forming part of a movable frame, to be described later on. The striking-lever 17, the upper link 15, the type-carrier 16, and the lower link 14 form a parallelogram by which the type-carrier 16 is held parallel to the striking-lever 17. The type-carrier 16 is provided with eight types, of which the upper four ones form the one group ready for the use when the fulcrum 43 occupies the position shown. The lower four types form the other group, which will be brought into use only when the fulcrum 43 is raised. The lower link 14 forms the one arm of a two-armed lever fulcrumed at a distance below the end of the striking-lever 17, and of which the other arm is denoted by 13. The end of the arm 13 is linked to the bent rod 11, which serves for bringing the several types of either group into the right position for striking against the paper-roll 33 at the printing-point. The lever mechanism is so arranged that on depressing either key first the respective type is brought into the proper position for striking by the bent rod 11 and afterward the striking-lever 17 is moved forward by the key-lever 1, the link 40, the bell-crank lever 41, and the rod 42, so that the type strikes against the paper-roll 33. On releasing the key the key-lever 1, with the parts connected therewith, is returned into the original position by the spring 84. The key-lever 1 is partly straight and partly bent downward. In order to reduce its weight, it is provided at the end with an opening 1'. Above this opening the key-lever 1 is provided with an arm carrying the pin 4, on which the two-armed subsidiary key-lever 3 5 is mounted to swing. The one arm, 5, is rigidly connected with the front key 6, while the other arm, 3, is linked with the bent rod 11, referred to above. When at rest, the two-armed subsidiary key-lever 3 5 occupies the position shown at Fig. 1, so that it is capable of swinging, the movement of its arm 3 being limited by the two stops 8 and 9, provided on the key-lever 1. The arm 3 is connected by the link 45 with the subsidiary key-lever 47, fulcrumed at 46 on the key-lever 1. The end of the subsidiary key-lever 47 is rigidly connected with the rear key 39. On depressing the front key 6 the subsidiary key-lever arm 5 will be moved downward and the arm 3 upward, and thereby also the bent rod 11, until the arm 3 strikes against the top stop 8. The bent rod 11 on its part will move the lever-arm 13 upward and by the other lever-arm 14 the type-carrier 16 downward, so that the uppermost type of the upper type group 48 will be brought into the right position. On further depressing the key 6 the key-lever 1 will move the striking-lever 17 forward in the manner described above, so that the uppermost type meets with the paper-roll 33 at the printing-point, as is indicated at Fig. 4. On depressing the rear key 39 it will, by the link 45 and the lever 3, move the bent rod 11 downward until the lever 3 is stopped by the lower stop 9. Thereby the type-carrier 16 will be moved upward and the lowermost type of the upper group 48 brought into the right position for striking against the paper-roll 33, as is indicated at Fig. 5. The stops 8 and 9 on the key-lever 1 are preferably made eccentric in order to adjust the stroke of the subsidiary key-lever 3 5 by turning the stops.

For manipulating the two inner keys 23 7 the following arrangement is made: On the key-lever 1 the subsidiary key-lever 49 is fulcrumed at 90, while it carries the key 7. This subsidiary key-lever 49 is provided with two stops 50 and 51, the latter resting on the arm 3 of the subsidiary key-lever 3 5 when these parts occupy the position shown at Fig. 1, while the other stop 50 does not touch the other arm 5 of that subsidiary key-lever 3 5. On depressing the key 7 the subsidiary key-lever 49 will, by the stop 51, take the arm 3 of the subsidiary key-lever 3 5 along with it until the other arm 5 of the latter strikes against the other stop 50 on the lever 49. Thereby the type-carrier 16 will be raised only so much as to bring the third type of the group 48 into the right position for striking. As in this case on both sides of the fulcrum 4 of the subsidiary key-lever 3 5 two supports 50 51 are afforded to the subsidiary key-lever 49, the key-lever 1 will be taken along with the key 7 on the latter being depressed further, so that the third type will be caused to strike against the paper-roll 33, as is indicated at Fig. 6. On the key-lever 1 the subsidiary key-lever 53 is fulcrumed at 52, while it carries the key 23. This subsidiary key-lever carries two stops 54 and 55, which rest on the subsidiary key-lever 3 5, while the parts occupy the position shown at Fig. 1. On depressing the key 23 it will take along with it the two subsidiary key-levers 53 and 3 5 and the key-lever 1 without changing the position of the type-carrier 16, so that the second type of the upper group 48 will be in the right position for striking against the paper-roll 33, as is shown at Fig. 7. In order to return the subsidiary key-lever 3 5 to its original position, (shown at Fig. 1,) the subsidiary key-lever 53 is connected by a spiral spring 26 with the key-lever 1. The said lever 53 is fulcrumed at 52 and provided with stops or lugs 54 55. Normally—that is to say, when the key of this lever is not depressed—the stop 54 is in contact with arm 5 and stop 55 is in contact with arm 3 of the key-lever 3 5. One end of spring 26 is attached to the key-lever 1 and its other end to the lever 53, and thus it always tends to draw lever 1 downward and determines the position of levers 53 and 3 5. When key 23 is depressed, the lever 53 does not change its position with reference to the key-lever 1. On the other hand, when the keys of the other levers 6, 7, or 39 are depressed the lever 53 is moved or changes its position relative to the key-lever 1. The spring 26 is so arranged that upon release of the key-lever the lever 53 is always brought back into its original position, and the stops 54 55 thereupon bring the key-lever to the middle position.

On the base-plate 31 two studs or supports 143 (of which only one is shown at Fig. 1) are arranged, which carry an arc-shaped bridge 123. Against the internal side of the bridge 123 the ends 12 of the bent rods 11 and the levers 13 are made to bear. Thereby the key-levers 1 are held in their usual horizontal position (shown at Fig. 1) when at rest. For the purpose of avoiding shocks and preventing the parts of the lever mechanism from wearing off quickly the internal wall of the bridge 123 is lined with felt or other elastic material.

The key-lever 1 is at its end guided by a slot provided in the base-plate 31 and by a slot of the guide-plate 44, affixed to the base-plate for limiting the downward movement of the key-lever.

On the key-lever 1 a fork-shaped plate 102, Fig. 2, is affixed, which is provided with three slots for guiding the subsidiary key-levers 49, 53, and 3 5, so that these are prevented from clogging.

For the purpose of bringing the lower group 56 of the types into use the striking-lever 17 is connected with a movable frame, which may be raised by depressing a special key and lowered by its weight on releasing the key. As already mentioned above, the paper-roll 33, with its carriage 78, running on balls, need not be raised or lowered, but may remain on the same height. The movable frame is constructed as follows: At the right and left hand side of the base-plate 31 supports 66 67 are provided, which project upward and downward. In the lower projections 66 bolts or pins 58 are arranged, on which an arc-shaped lever 59 (see also Figs. 3, 8, and 9) is mounted to swing. This lever is shown in section on the right hand at Fig. 1 and to rest on an adjustable screw 62. The left-hand side of this lever 59 is connected with a straight lever 60, reaching to the front and carrying the key 61. The upper projections 67 of the two supports are provided each with a bolt or pin 65, around which a link 64 swings. The two links 64 (of which only one is shown at Fig. 1) are connected with the sides of the arc-shaped lever 59 by two links 63, all the parts forming a parallelogram, so that the links 63 are held vertical when moving up and down. To the two links 63 a bent rod or bridge 57 is affixed, which is provided with a plurality of projections 140 for carrying the several striking-levers 17, the number of which equals that of the key-levers 1. The movable frame thus described and the lever mechanism occupy when at rest the position shown at Fig. 1. On depressing the key 61 the arc-shaped lever 59, with the links 63, the bridge 57, the striking-levers 17, the links 15, the levers 13 14, and the type-carriers 16, will be raised. Since the bent rod 2, which serves as fulcrums for the various key-levers 1, is stationary, the key-levers 1, with the subsidiary key-levers 47, 49, 53, and 3 5 and the keys 6 23 7 39, also the bent rod 11, will remain undisturbed when the key 61 is depressed and released for raising and lowering the movable frame, respectively. Then the lever 13 14 will turn around the fulcrum 12 at the bent rod 11, and as the arms 13 and 14 are preferably alike in length it follows that on raising the striking-lever 17 through a certain distance the type-carrier 16 will be raised through double this distance. The center lines of the parts 17, 15, 13, 14, and 16 will then occupy the position indicated by the dotted lines at Fig. 1, and the four types of the lower group 56 will be brought into the right position for striking against the paper-roll on depressing the respective keys, as explained above.

The type-guiding frame 68 requires to be raised and lowered simultaneously with the type-carriers 16. For this purpose the two sides of the type-guiding frame 68 slide up and down on the guides 71 and are linked with the two levers 70, (of which only one is shown at Fig. 1.) The latter turn around pins provided on the studs 69 and are at about their middles linked with vertical arms 72 of the bridge 57. Thus on depressing the key 61 the type-guiding frame 68 will be raised through the proper distance to allow of the types striking at the printing-point.

Against the key-levers 1 bears from below a bow 74, swinging around pins provided on the projections 73 of the base-plate 31, this bow 74 serving for shifting the carriage 78, with the paper-roll 33, and for feeding the ribbon. For this purpose the sides of the bow 74 are lengthened beyond the fulcrums and carry on a cross-shaft 75' a roll 75, which bears against the bent end 76' of a rod 76. The latter is connected at about its middle with the spring 77 and carries at its upper end teeth for engaging the teeth of a rack 133, affixed to the carriage 78. The spring 77 at its other end is affixed to a frame 85, referred to later on, and which serves as a guide on which the carriage 78 by means of balls moves. The rod 76 in a known manner locks and releases the carriage 78 for stopping and shifting the paper-roll 33, respectively. On depressing either key on any key-lever 1 the bow 74 will be moved downward and the roll 75 upward, so that the latter slides on the bent end 76', and thereby pushes off the rod 76 and the spring 77, so that the respective known device will be actuated for releasing and shifting the carriage 78. On releasing the respective key the bow 74 is returned into its original position by the spring 77, which by the bent end 76' of the rod 76 presses downward the roll 75. For feeding the ribbon 91 the sides of the bows 74 are provided with vertical arms 80, which act alternately upon the feed-wheels 94 when either key on any key-lever is depressed. Then the ribbon 91 will be fed by either roll 93 and its hollow shaft 92, as is indicated at Fig. 13. The hollow shaft 92, the feed-wheel 94, and the roll 93 form a whole, turning on the upper thinner part of the stud 95. The two studs 95 are rigidly connected with the plate 98 and engage with their ends in oblong or oval slots 96, provided in the base-plate 31. By means of the knob 97, affixed on the plate 98, the latter, and with it the two studs 95, may be shifted across through a short distance in either direction, so as to disengage the one arm 80 from its feed-wheel 94 and to engage the other arm 80 with its feed-wheel 94 for reversing the motion of the ribbon. For spacing the words the bow 74 may be connected by links with a bow pivoted below the base-plate 31 and carrying at the front ends the spacing-key. As the construction of this spacing device may be of any known kind and does not form a part of this invention, the spacing device has been omitted from the drawings.

To insure the straightness of the lines and the correct position of the letters printed—i.e., the correctness of the printing position of the respective types—besides the movable type-guiding frame 68 also a stationary type-guide 134 may be employed, which may be affixed, for instance, to the studs 71. As shown in Fig. 1, the stationary type-guide 134 may be formed somewhat like a rack, in the recesses 135 of which, between the teeth 136, the hook-shaped end 137 of either type-carrier 16 may engage.

The frame 85, on which the carriage 78 moves, is preferably made revoluble, so that it may be inclined, and thereby moved from the type-guiding frame 68. Then all the printed words will be visible and may be corrected at ease by erasing, and the paper can be better introduced around the paper-roll. For this purpose on the base-plate 31 projections 86, Fig. 12, are provided on both sides of either leg of the frame 85 and which carry pins 87, around which the frame 85 may revolve. Between the base-plate 31 and each frame-leg a spiral spring 88 is arranged, which serves for pressing the frame 85, with the carriage 78 and the paper-roll 33, forward into the position shown at Fig. 1. When the frame 85 or the carriage 78 is pushed backward with the hand, the frame 85 assumes an inclined position (indicated by the dotted lines in Fig. 12,) while the spiral springs 88 are strained. For limiting the revolution of the frame 85 its legs are provided with projections 89, which strike against the base-plate 31. On releasing the frame 85 it will be returned by the springs 88 into the original position. For securing the frame 85 in its vertical position in case the type-writer is to be carried from a place to another one screws 142 (see Fig. 12) are provided in the feet of the frame-legs, which may engage threaded holes in the base-plate 31.

Where it is so preferred, the arrangement shown in Figs. 8 and 9 for raising the movable table may be replaced by another arrangement. (Shown in Fig. 10.) The arc-shaped lever 59 is substantially the same as in Figs. 8 and 9, only that its arc part is made flat in order to get more space for swinging. The arm 60 is replaced by another arm 124, affixed to the hollow shaft 120 of the lever 59. The arm 124 is connected by a link 125 with the shorter arm 127 of a two-armed lever 126, which latter is mounted to revolve around a pin 128 on a projection of the base-plate. The length of the arm 127 being about half that of the arm 124, the power for depressing the key 61 will be reduced to about half that required in the previous arrangement. A further arrangement (shown in Fig. 11) may be employed, if so preferred, in place of the two preceding arrangements. The key 61 is affixed to the arm 129 of a bell-crank lever pivoted at 132 beneath the base-plate 31. The shorter arm 130 carries a pin 131, which grips under the one side of the arc-shaped lever 59. The lever-arm of the pin 131 in relation to the axis 132 being smaller than that in relation to the axis 120, the power required for depressing the key 61 will be equally reduced in comparison with the arrangement shown in Figs. 8 and 9.

Figs. 14 and 15 show diagrammatically a modification of the type-writer, in which three keys are connected with every key-lever by means of subsidiary key-levers. In consequence of this arrangement every type-carrier is provided with nine types, divided into three groups of three each. The paper-roll is so arranged that it may in a known manner be raised and lowered, and thereby brought into three different heights in correspondence with the three type groups. In this case there is no arrangement made for raising or lowering the striking-levers, as described above. On the contrary, the fulcrums of the striking-levers are made stationary. By this arrangement, again, the advantage is obtained that a single key-lever may be employed for striking no less than nine different types against the paper-roll. On the base-plate 31 a projection 20 is provided for every key-lever 100 and its striking-lever 17, which are mounted to move around the fulcrums 101 and 102, respectively. The key-lever 100 is preferably made of two side parts secured together by distance-pieces 104 and 105, so that the subsidiary key-levers may better be arranged on them. The key-lever 100 is provided with a short arm 103, which bears against the striking-lever 17. The key-lever 100 and the striking-lever 17 are connected with each other by a spiral spring 34, which on the respective key being released draws the two parts near to each other, so that, on the one hand, the striking-lever 17, with the parts connected therewith, attains the position indicated by the dotted lines in Fig. 14, and, on the other hand, the key-lever 100 is suspended in its horizontal position, the three keys occupying the positions indicated by the dotted lines in Fig. 14. The parts 11, 13, 14, 15, and 16 are substantially the same as before, only that the two-armed lever 13 14 is mounted on the end of the striking-lever 17 to swing. The side parts of the key-lever 100 are at the front ends bent upward, and in these projections the pin 106 is arranged, around which the two-armed subsidiary key-lever 107 108 swings. The one arm, 107, of the latter carries the key 109 and the other arm, 108, the key 110, while its end at 10 is linked to the bent rod 11. Between the side parts of the key-lever 100 the stops 111 and 112 are arranged, between which the lever 108 may swing. On depressing the front key 109 the arm 108 will move upward until it meets with the stop 111, when the bent rod 11 is raised and the type-carrier 16 lowered, so as to bring the upper type of any group into the right position. On depressing farther the key 109 the key-lever 100, with the parts connected with it, is lowered, so that by its arm 103 the striking-lever 17 is pushed forward and the type caused to strike against the paper-roll. On the other hand, on depressing the rear key 110 the arm 108 will move downward until it meets with the other stop 112, when the bent rod 11 is lowered and the type-carrier 16 raised so as to bring the lower type of either group into the right position. On depressing farther the key 110 the key-lever 100 will cause the striking-lever 17 to move forward and the type to strike against the paper-roll. On the key-lever 100 the subsidiary key-lever 113 is mounted to swing around the fulcrum 114. It carries a plate 115, on which the middle key 116 is affixed. Stops 24 25 have the same operation with respect to lever 113 as stops 54 55 with lever 53. These stops are formed in the following manner: The small right-angle plate 115 engages with the end of lever 13 and projects laterally and is provided with notches corresponding to the arms of key-lever 107 108. The subsidiary key-lever 113 is connected with the key-lever 100 by the spiral spring 117, which presses the downward-bent edges of the plate 115 on the two arms of the subsidiary key-lever 107 108, which is thereby held in its middle position. On depressing the middle key 116 the two subsidiary key-levers 113, 107, and 108 will not change their positions, which means that the middle type of either group is in the right position for striking. On further depressing the key 116 the key-lever 100 will be moved downward, while its arm 103 pushes the striking-lever 17 forward, so that the middle type of either group meets with the paper-roll 33. This position of the parts is shown at Fig. 14, the paper-roll 33 being assumed to be in its middle position. If the paper-roll is in a known manner raised or lowered, it is evident that the middle type of the upper or the lower group, respectively, will meet with the paper-roll at the printing-point. The downward movement of the key-lever 100 is limited by the adjustable screw 29, provided in the base-plate 31 and bearing against the distance-piece 105. Between the key-lever 100 and the striking-lever 17 a spiral spring 34 may be arranged for returning the lever mechanism into the original position after the printing of the type. This spring also serves for regulating the striking force of the type, the striking-lever 17 being enabled to move forward only after the live force required for overcoming the resistance of the spring has been produced. The spiral spring 34 may also be attached to the base-plate 31, or it may be replaced by a flat spring 35. (Indicated by a dotted line in Fig. 14.)

Figs. 16 to 20 show a further and simplified modification of the type-disposing device actuated by four keys and carried equally by the key-lever. The key-lever 146 is mounted at 145 to revolve around the bent arc 2 in Figs. 1, 3, 4, 5, 6, and 7 in the same manner as the key-lever 1, which latter is thereby replaced. The key-lever 146 carries a pin 147, on which the subsidiary two-armed key-lever 148 149 is mounted to swing. The one arm 148 of this subsidiary key-lever carries the front key 150 and the other arm 149 the rear key 151. The arm 149 is to be connected at 150 with the bent rod 11, which by the help of the link parallelogram 13 14 15 16 17 causes the respective types to be brought into the proper position for printing, as described above. The key-lever further carries a pin 154, on which the second subsidiary key-lever 155 is mounted to swing. As shown at Figs. 16 and 17, the subsidiary key-lever 155 is provided with two projections 156 and 157, of which the one 156 usually rests on the arm 148 of the said subsidiary key-lever 148 149, while the other projection is usually at a certain height above the arm 149. The end of the subsidiary key-lever 155 carries the second key 160. The key-lever 146 finally carries a pin 161, on which the third subsidiary key-lever 162 is mounted to swing. This subsidiary key-lever carries the third key 166 and also two projections 163 and 164, which latter usually rest on the arms 148 and 149, respectively, of the first subsidiary key-lever. In a similar manner, as described above, all the subsidiary key-levers are guided by a fork-shaped plate 165, affixed to the key-lever 146. A spring 166, which connects the third subsidiary key-lever 162 with the key-lever 146, is employed for returning all the parts of this type-disposing device into the original position (shown at Fig. 16) on the respective key being released. The stops 163 164 lie normally in contact with the said key-lever 162. The spring 166 is put under tension when the keys of levers 150, 166, or 151 are depressed, and so upon release of such depressed keys the spring causes the lever 162 to resume its former position, whereupon the stops 163 164 again come in contact with the key-levers 148 and 149, and the latter are thus caused to resume their original position. This type-disposing device works in the following manner: On depressing the front key 150 the arm 148 of the first subsidiary key-lever is moved downward and the other arm 149 upward until the latter strikes against the projection 152 of the key-lever 146. Thereby the type-carrier 16 will be lowered by means of the parts 11, 13, 14, 15, and 17 to such an extent that the uppermost type of either type group (as explained above) will be brought to the proper position for printing. The positions of the subsidiary key-levers on depressing the front keys is illustrated by Fig. 18. On depressing the rear key 151 the arm 148 of the first subsidiary key-lever will be moved upward and the other arm 149 downward until it strikes against the projection 153 of the key-lever 146. Thereby the type-carrier 16 will be raised so much as to bring the lowermost type of either group into the right position for printing. The positions of the subsidiary key-levers in this case are illustrated by Fig. 19. On depressing the second key 160 the arm 148 of the first subsidiary key-lever will be moved downward by the projection 156 and the other arm 149 upward until it strikes against the projection 157 of the second subsidiary key-lever 155. Thereby the type-carrier 16 will be lowered only so much as to bring the second type of either group into the printing position. The positions of the subsidiary key-levers in this case are illustrated by Fig. 20. For bringing the third type of either group into the printing position no change of the subsidiary key-levers with regard to each other is required. The said pin 147 on which the first subsidiary key-lever 148 149 swings engages with a slot 164 of the third subsidiary key-lever 162, carrying the third key 166. Usually the upper end of the slot 164 rests on the pin 147, (see Fig. 16,) so on depressing the third key 166 it will take along with it the key-lever 146, the type-carrier 16 occupying such a position that the third type is ready for printing.

The type-disposing device described so far may be varied in its details without deviating from the spirit of my invention. It is essential to arrange the type-disposing device between the key-lever and the keys and so that all the parts are supported or carried by the key-lever. The link parallelogram may be replaced by other mechanism connecting positively the type-carrier with the keys. The rod 11 is preferably bent to facilitate the adjustment of the various parts, the rod 11 requiring only to be stretched a little or to be bent slightly more, as the case may be. It is essential that the key-lever is given a uniform stroke, so that a uniform force for striking the several types is obtained. Instead of the type-carrier 16 shown other type-carriers carrying a plurality of types may be employed, which are connected positively in a suitable manner with the keys.

What I claim as my invention, and desire to secure by Letters Patent, is—

1. In a type-writer, the combination with a key-lever, of a plurality of keys, a type-carrier provided with a plurality of types, a striking-lever, means for connecting the type-carrier with the striking-lever, means for positively connecting the key-lever with the striking-lever, and means arranged between the said key-lever and said keys and carried by said key-lever for transmitting the movement of either of said keys to said key-lever and said type-carrier for bringing the respective type into the right position and striking it against the paper-roll, substantially as set forth.

2. In a type-writer, the combination with a key-lever, of a plurality of keys, a type-carrier provided with a plurality of types, a type-disposing device connected positively with said keys, the said device being arranged between said keys and said key-lever and carried by the latter, and means for transmitting the movement of said type-disposing device on depressing either of said keys to said type-carrier for bringing the respective type into the right position and striking it against the paper-roll, substantially as set forth.

3. In a type-writer, the combination with a key-lever, of a plurality of keys, a type-disposing device connected positively with said keys and carried by said key-lever, a type-carrier provided with a plurality of types, a striking-lever, a link parallelogram, two opposite sides of which being formed by said type-carrier and said striking-lever, means for positively connecting said type-disposing device with said link parallelogram for bringing either type into the right position on depressing the respective key, and means for positively connecting said key-lever with said striking-lever, so as to strike the type adjusted against the paper-roll, substantially as set forth.

4. In a type-writer, the combination with a key-lever, of a plurality of keys, a striking-lever, a type-carrier provided with a plurality of types, means for connecting said type-carrier with said striking-lever, and means carried by said key-lever for transmitting the movement of either of said keys to said key-lever, said striking-lever and said type-carrier for striking the respective type against the paper-roll, substantially as set forth.

5. In a type-writer, the combination with a key-lever, of a plurality of keys, a striking-lever, a two-armed lever mounted on said striking-lever to swing, a type-carrier provided with a plurality of types and linked to the one arm of said two-armed lever, a link linked with said striking-lever and with said type-carrier, whereby a parallelogram is formed, means carried by said key-lever for transmitting the movement of either of said keys to said key-lever and to the other arm of said two-armed lever for bringing the respective type into the right position, and means for transmitting the movement of said key-lever to said striking-lever for striking the type against the paper-roll, substantially as set forth.

6. In a type-writer, the combination with a key-lever, of a plurality of keys, a plurality of subsidiary key-levers arranged between said keys and said key-lever and carried by the latter, means for connecting the same positively, a striking-lever, a two-armed lever mounted on said striking-lever to swing, a type-carrier provided with a plurality of types and linked to the one arm of said two-armed lever, a link linked with said striking-lever and with said type-carrier, whereby a parallelogram is formed, a rod linked with the other arm of said two-armed lever and with one of said subsidiary key-levers, and means for transmitting the movement of said key-lever to said striking-lever, so that on depressing either of said keys the respective type is brought into the right position and caused to strike against the paper-roll, substantially as set forth.

7. In a type-writer, the combination with a key-lever, of four keys, a plurality of subsidiary key-levers arranged between said keys and said key-lever and carried by the latter, means for restricting the movements of same with respect to each other, a frame arranged to be raised and lowered, a striking-lever mounted on said frame to swing, means for returning said striking-lever to the original position, a two-armed lever mounted on said striking-lever to swing, a type-carrier provided with eight types in two groups of four each and linked to the one arm of said two-armed lever, a link linked with said striking-lever and with said type-carrier, whereby a parallelogram is formed, a rod linked with the other arm of said two-armed lever and with one of said subsidiary key-levers, and means for transmitting the movement of said key-lever to said striking-lever, so that on depressing either of said keys the respective type of either the upper or the lower group is brought into the right position, while said frame is at rest or raised respectively, and caused to strike against the paper-roll, substantially as set forth.

8. In a type-writer, the combination with a key-lever, of four keys, a striking-lever, means for returning said striking-lever to the original position, means for raising and lowering said striking-lever, a type-carrier provided with eight types in two groups of four each, means for connecting said type-carrier with said striking-lever, and means carried by said key-lever for transmitting the movement of either of said keys to said key-lever, said type-carrier and said striking-lever for bringing the respective type of either the upper or the lower group into the right position and striking it against the paper-roll, while said striking-lever is at rest or raised respectively, substantially as set forth.

9. In a type-writer, the combination with a key-lever, of four keys, a striking-lever, means for returning said striking-lever to the original position, means for raising and lowering said striking-lever, a two-armed lever mounted on said striking-lever to swing, a type-carrier provided with eight types in two groups of four each and linked to the one arm of said two-armed lever, a link linked with said striking-lever and with said type-carrier, whereby a parallelogram is formed, means carried by said key-lever for transmitting the movement of either of said keys to said key-lever and to the other arm of said two-armed lever for bringing the respective type of either the upper or the lower group into the proper position, while said striking-lever is at rest or raised respectively, and means for transmitting the movement of said key-lever to said striking-lever for striking the type against the paper-roll, substantially as set forth.

10. In a type-writer, the combination with a key-lever, of four keys, a plurality of subsidiary key-levers arranged between said keys and said key-lever and carried by the latter, means for restricting the movement of same, a striking-lever, a spring for returning said striking-lever into the original position, means for raising and lowering said striking-lever, a two-armed lever mounted on said striking-lever to swing, a type-carrier provided with eight types in two groups of four each and linked to the one arm of said two-armed lever, a link linked with said striking-lever and with said type-carrier, whereby a parallelogram is formed, a rod linked with the other arm of said two-armed lever and with one of said subsidiary key-levers, and means for transmitting the movement of said key-lever to said striking-lever, so that on depressing either of said keys the respective type of either the upper or the lower group is brought into the right position and caused to strike against the paper-roll, while said striking-lever is at rest or raised respectively, substantially as set forth.

11. In a type-writer, the combination with a key-lever, of four keys, a striking-lever, a spring for returning said striking-lever to the original position, a two-armed lever mounted on said striking-lever to swing, a type-carrier provided with four types and linked to the one arm of said two-armed lever, a link linked with said striking-lever and with said type-carrier, whereby a parallelogram is formed, a two-armed subsidiary key-lever, mounted on said key-lever to swing between two stops and carrying on the front arm the front key and on the rear arm the rear key, a rod linked with the other arm of said two-armed lever and with the rear arm of said two-armed subsidiary key-lever, so that on depressing said front or rear key said type-carrier is lowered or raised respectively and the uppermost or lowermost type respectively brought into the right position for printing, means carried by said key-lever for transmitting the movement of the second and the third key to said rod, so that on depressing said second or third key the second or third type respectively is brought into the right position for printing, and means for transmitting the movement of said key-lever to said striking-lever for striking the respective type against the paper-roll, substantially as set forth.

12. In a type-writer, the combination with a key-lever, of four keys, a striking-lever, a spring for returning said striking-lever to the original position, means for raising and lowering said striking-lever, a two-armed lever mounted on said striking-lever to swing, a type-carrier provided with an upper and a lower group of four types each and linked to the one arm of said two-armed lever, a link linked with said striking-lever and with said type-carrier, whereby a parallelogram is formed, a two-armed subsidiary key-lever mounted on said key-lever to swing between two stops and carrying on the front arm the front key and on the rear arm the rear key, a rod linked with the other arm of said two-armed lever and with the rear arm of said two-armed subsidiary key-lever, so that on depressing said front or rear key said type-carrier is lowered or raised respectively and the uppermost or lowermost type respectively of either group brought into the right position for printing, means carried by said key-lever for transmitting the movement of the second and the third key to said rod, so that on depressing said second or third key the second or third type respectively of either group is brought into the right position for printing, and means for transmitting the movement of said key-lever to said striking-lever for striking the respective type against the paper-roll, substantially as set forth.

13. In a type-writer, the combination with a key-lever, of four keys, a striking-lever, a spring for returning said striking-lever to the original position, a two-armed lever mounted on said striking-lever to swing, a type-carrier provided with four types and linked to the one arm of said two-armed lever, a link linked with said striking-lever and with said type-carrier, whereby a parallelogram is formed, a two-armed first subsidiary key-lever mounted on said key-lever to swing between two stops and carrying on the front arm the front key and on the rear arm the rear key, a rod linked with the other arm of said two-armed lever and with the rear arm of said first subsidiary key-lever, so that on depressing said front or rear key said type-carrier is lowered or raised respectively and the uppermost or the lowermost type respectively brought into the right position for printing, a one-armed second subsidiary key-lever mounted on said key-lever and carrying the second key and also two stops, of which usually the one rests on the front arm and the other stop is at a certain height above the rear arm of said first subsidiary key-lever, so that on depressing said second key said second subsidiary key-lever takes along with it by the one stop the front arm of said first subsidiary key-lever, until the rear arm of the latter strikes against the other stop, when the second type will be brought into the right position for printing, means carried by said key-lever for transmitting the movement of the third key to the third type for bringing same into the right position for printing, and means for transmitting the movement of said key-lever to said striking-lever for striking the respective type against the paper-roll, substantially as set forth.

14. In a type-writer, the combination with a key-lever, of four keys, a striking-lever, a spring for returning said striking-lever to the original position, means for raising and lowering said striking-lever, a two-armed lever mounted on said striking-lever to swing, a type-carrier provided with an upper and a lower group of four types each and linked to the one arm of said two-armed lever, a link linked with said striking-lever and with said type-carrier, whereby a parallelogram is formed, a two-armed first subsidiary key-lever mounted on said key-lever to swing between two stops and carrying on the front arm the front key and on the rear arm the rear key, a rod linked with the other arm of said two-armed lever and with the rear arm of said first subsidiary key-lever, so that on depressing said front or rear key said type-carrier is lowered or raised respectively and the uppermost or lowermost type respectively of either group brought into the right position for printing, a one-armed second subsidiary key-lever mounted on said key-lever and carrying the second key and also two stops, of which usually the one rests on the front arm and the other stop is at a certain height above the rear arm of said first subsidiary key-lever so that on depressing said second key said second subsidiary key-lever takes along with it by the one stop the front arm of said first subsidiary key-lever, until the other arm of the latter strikes against the other stop, when the second type of either group will be brought into the right position for printing, means carried by said key-lever for transmitting the movement of the third key to the third type of either group for bringing same into the right position for printing, and means for transmitting the movement of said key-lever to said striking-lever for striking the respective type against the paper-roll, substantially as set forth.

15. In a type-writer, the combination with a key-lever, of four keys, a striking-lever, a spring for returning said striking-lever to the original position, a two-armed lever mounted on said striking-lever to swing, a type-carrier provided with four types and linked to the one arm of said two-armed lever, a link linked with said striking-lever and with said type-carrier, whereby a parallelogram is formed, a two-armed first subsidiary key-lever mounted on said key-lever to swing between two stops and carrying on the front arm the front key and on the rear arm the rear key, a rod linked with the other arm of said two-armed lever and with the rear arm of said first subsidiary key-lever, so that on depressing said front or rear key said type-carrier is lowered or raised respectively and the uppermost or lowermost type respectively brought into the right position for printing, a one-armed second subsidiary key-lever mounted on said key-lever and carrying the second key and also two stops, of which usually the one rests on the front arm and the other stop is at a certain height above the rear arm of said first subsidiary key-lever, so that on depressing said second key said second subsidiary key-lever takes along with it by the one stop the front arm of said first subsidiary key-lever, until the rear arm of the latter strikes against the other stop, when the second type will be brought into the right position for printing, a one-armed third subsidiary key-lever mounted on said key-lever and carrying the third key-lever and provided with a slot, the upper end of which usually rests on the pivot of said first subsidiary key-lever, so that on depressing said third key said third subsidiary key-lever takes along with it said key-lever by the pivot of said first subsidiary key-lever, while the third type is in the right position for printing, and means for transmitting the movement of said key-lever to said striking-lever for striking the respective type against the paper-roll, substantially as set forth.

16. In a type-writer, the combination with a key-lever, of four keys, a striking-lever, a spring for returning said striking-lever to the original position, means for raising and lowering said striking-lever, a two-armed lever mounted on said striking-lever to swing, a type-carrier provided with an upper and a lower group of four types each and linked to the one arm of said two-armed lever, a link linked with said striking-lever and with said type-carrier, whereby a parallelogram is formed, a two-armed first subsidiary key-lever mounted on said key-lever to swing between two stops and carrying on the front arm the front key and on the rear arm the rear key, a rod linked with the other arm of said two-armed lever and with the rear arm of said first subsidiary key-lever, so that on depressing said front or rear key said type-carrier is lowered or raised respectively and the uppermost or lowermost type respectively by either group brought into the right position for printing, a one-armed second subsidiary key-lever mounted on said key-lever and carrying the second key and also two stops, of which usually the one rests on the front arm and the other stop is at a certain height above the rear arm of said first subsidiary key-lever, so that on depressing said second key said second subsidiary key-lever takes along with it by the one stop the front arm of said first subsidiary key-lever, until the other arm of the latter strikes against the other stop, when the second type of either group will be brought into the right position for printing, a one-armed third subsidiary key-lever mounted on said key-lever and carrying the third key and provided with a slot, the upper end of which usually rests on the pivot of said first subsidiary key-lever, so that on depressing said third key said third subsidiary key-lever takes along with it said key-lever by the pivot of said first subsidiary key-lever, while the third type of either group is in the right position for printing, and means for transmitting the movement of said key-lever to said striking-lever for striking the respective type against the paper-roll, substantially as set forth.

17. In a type-writer, the combination with a key-lever, of a plurality of keys, a type-disposing device arranged between said keys and said key-lever and carried by the latter, a striking-lever provided with a downward-projecting arm, a spring affixed to the base-plate for returning said striking-lever to the original position, means for raising and lowering the fulcrum of said striking-lever, a two-armed lever mounted on said striking-lever to swing, a rod linked with the front arm of said two-armed lever and with said type-disposing device, a type-carrier provided with an upper and a lower group of a plurality of types each and linked with the rear arm of said two-armed lever, a link linked with said striking-lever and said type-carrier, whereby a parallelogram is formed, a bell-crank lever mounted on the base-plate to rock, a link linked with said key-lever and with the one arm of said bell-crank lever, and a rod connecting the other arm of said bell-crank lever with said arm of said striking-lever, so that on depressing either of said keys the respective type of either the upper or lower group is brought into the right position for printing and struck against the paper-roll, while the fulcrum of said striking-lever is at rest or raised respectively, substantially as set forth.

18. In a type-writer, the combination with a key-lever, of a plurality of keys, means carried by said key-lever for connecting same with said keys, a horizontal arc-shaped lever mounted under the base-plate to swing around a cross center line, a raising-key and means for transmitting its movement to said arc-shaped lever, adjustable means for supporting said arc-shaped lever, two vertical links linked with the sides of said arc-shaped lever and carrying between them a bridge, two levers mounted on the base-plate to swing around a cross center line in the same vertical plane as the fulcrums of said arc-shaped lever and linked with said two vertical links whereby a parallelogram is formed, a striking-lever mounted on said bridge, so that on depressing and releasing said raising-key said striking-lever is raised and lowered respectively, a spring affixed to the base-plate for returning said striking-lever to the original position, a two-armed lever mounted on said striking-lever to swing, the front arm of which is connected with said means connecting the key-lever and the keys, a type-carrier carrying a plurality of types, the number of which is double that of said keys, and linked with the rear arm of said two-armed lever, a link linked with said striking-lever and type-carrier, whereby a parallelogram is formed with said striking-lever, so that on depressing either of said keys the respective type of either the upper or the lower group is caused to strike against the paper-roll, while said bridge is at rest or raised respectively, substantially as set forth.

19. In a type-writer, the combination with a key-lever, of a plurality of keys, means carried by said key-lever for connecting same with said keys, a horizontal arc-shaped lever mounted under the base-plate to swing around a cross center line, adjustable means for supporting said arc-shaped lever, two vertical links linked with the sides of said arc-shaped lever and carrying between them a bridge, two levers mounted on the base-plate to swing around a cross center line in the same vertical plane as the fulcrums of said arc-shaped lever and linked with said two vertical links, whereby a parallelogram is formed, a striking-lever mounted on said bridge, a two-armed key-lever pivoted near the fulcrums of said arc-shaped lever, the longer front arm carrying a key and the shorter rear arm gripping under said arc-shaped lever, so that on depressing and releasing said key said striking-lever is raised and lowered respectively, a two-armed lever mounted on said striking-lever to swing, the front arm of which is connected with said means connecting the key-lever and the keys, a type-carrier carrying a plurality of types, the number of which is double that of said keys, and linked with the rear arm of said two-armed lever, a link linked with said striking-lever and type-carrier, whereby a parallelogram is formed, and means for connecting said key-lever with said striking-lever, so that on depressing either of said keys the respective type of either the upper or the lower group is caused to strike against the paper-roll, while said bridge is at rest or raised respectively, substantially as set forth.

20. In a type-writer, the combination with a key-lever, of a plurality of keys, a type-disposing device carried by said key-lever for connecting same with said keys, a horizontal arc-shaped lever mounted under the base-plate to swing around a cross center line, a raising-key and means for transmitting its movement to said arc-shaped lever, adjustable means for supporting the latter, two vertical links linked with the sides of said arc-shaped lever and carrying between them a bridge, two levers mounted on the base-plate to swing around a cross center line in the same vertical plane as the fulcrums of said arc-shaped lever and linked with said two vertical links, whereby a parallelogram is formed, a striking-lever mounted on said bridge, a type-carrier connected with said striking-lever, means for connecting said striking-lever with said type-disposing device, two vertical studs mounted on the base-plate near the paper-roll, a type-guiding frame arranged on said vertical studs to slide, two supports affixed on the base-plate, two levers mounted on said supports and linked with said type-guiding frame, two vertical links connecting these levers with said parallelogram, so that on depressing and releasing said raising-key said striking-lever with type-carrier and said type-guiding frame are simultaneously raised and lowered respectively, substantially as set forth.

EDUARD RUNGE.

Witnesses:
　WOLDEMAR HAUPT,
　HENRY HASPER.